(12) United States Patent
Carbonneau et al.

(10) Patent No.: US 6,445,581 B1
(45) Date of Patent: Sep. 3, 2002

(54) DISK DRIVE STORAGE ENCLOSURE WITH ISOLATED COOLING PATH FOR STORAGE MEDIA

(75) Inventors: Guy A. Carbonneau, Winter Springs; Larry G. Kibler, St. Cloud, both of FL (US)

(73) Assignee: NSTOR Corporation, San Diego, CA (US)

( * ) Notice: Subject to any disclaimer, the term of this patent is extended or adjusted under 35 U.S.C. 154(b) by 0 days.

(21) Appl. No.: 09/614,655

(22) Filed: Jul. 12, 2000

(51) Int. Cl.[7] .............................................. G06F 13/62
(52) U.S. Cl. ..................... 361/687; 361/707; 165/80.4; 174/15.2
(58) Field of Search ................................ 361/687, 699, 361/680, 681, 700, 704, 707; 364/708.1; 165/80.4, 104.33, 104.21; 62/259.2; 174/15.2

(56) References Cited

U.S. PATENT DOCUMENTS 5,953,209 A * 9/1999 Chiu ........................... 361/697
6,115,250 A * 9/2000 Schmitt ....................... 361/695
6,181,556 B1 * 1/2001 Allman ........................ 361/690

* cited by examiner

*Primary Examiner*—Darren Schuberg
*Assistant Examiner*—Hung Van Duong
(74) *Attorney, Agent, or Firm*—Dan Hubert & Assoc.

(57) ABSTRACT

A disk drive storage enclosure includes one cooling path for storage media and a separate cooling path for non-drive storage support equipment such as controller hardware, power supplies, circuit memory, processors, etc. Within the enclosure, storage media are stored up front, with non-drive storage support equipment stored at rear. The storage media and non-drive equipment are separated by a central ventilating chamber. In one cooling path, intake air enters the storage media from the enclosure's front face, then passes into the central ventilating chamber before exhausting through the chamber's side wall. A separate cooling path serves the non-drive storage support equipment. In this path, intake air passes laterally through the non-drive storage support equipment. The cooling paths are driven by fan assemblies, which may include redundant fan units with shutoff gates that are automatically activated if a fan unit fails to prevent back flow.

19 Claims, 3 Drawing Sheets

DISK DRIVE STORAGE ENCLOSURE WITH ISOLATED COOLING PATH FOR STORAGE MEDIA

BACKGROUND OF THE INVENTION

1. Field of the Invention

The present invention relates to modular disk drive storage trays. More particularly, the invention concerns a disk drive storage enclosure with one cooling path for the storage media and a separate cooling path for other non-drive storage support equipment such as the control electronics and power supply.

2. Description of the Related Art

Today's information age presents an incredible amount of data to manage. Since computers are the chief reason for this data explosion, most of this data exists in electronic form. Accordingly, computers are further needed to process, transmit, receive, and store such data.

Data storage is a critical function, whether it occurs in extremely fast and short term storage such as a random access memory, longer term storage such as magnetic disk drive storage, or archival storage such as magnetic tape. Magnetic disk drive storage is a popular means of storage because stored data persists even without a continual source of electricity, and because this type of data storage is affordable for many applications.

In addition to the familiar hard drives of personal computers, magnetic disk drive storage is frequently implemented on a more massive scale. For example, some systems aggregate a large number of magnetic disk drives into a single storage tray, utilizing control electronics, power supplies, cooling features, and other infrastructure that is common to all drives in the tray.

Although such trays may be used individually, their modular nature is one of their chief benefits. Namely, the shape of such trays permits the trays to be stackably mounted together in a large, frame or "rack." Trays in a rack are traditionally positioned with the same orientation, permitting technicians to easily interconnect like components of the trays using busses, channels, or other suitable hardware, thereby aggregating their collective storage capabilities.

The contents of a representative tray include disk drives, control electronics, power supplies, cooling fans, and other related electrical equipment. The disk drives are typically mounted in front, with the other equipment being placed at rear. This arrangement is intentionally designed for convenient removal of disk drives, which have a relatively higher fail rate than other components in the tray. Because heat can cause disk drive failure, storage trays include a number of fans situated at the rear, to induce airflow from front to rear, first across the heat-sensitive drives and then across the remainder of the tray's contents. This front-to-rear cooling arrangement is also beneficial because it accommodates the frequent side-by-side positioning of storage racks, leaving the trays' front intakes and rear exhausts free from obstruction.

Conventional storage trays enjoy widespread use today, and satisfy many different applications. Nonetheless, engineers at nStor Technologies, Inc. are continually interested in improving the performance and efficiency of mass storage machines. One area of possible focus concerns the cooling of magnetic disk drives in mass storage, since heat is still a significant cause of disk drive failures.

SUMMARY OF THE INVENTION

Broadly, the present invention concerns a disk drive storage enclosure with one cooling path for the storage media and a separate cooling path for other non-drive storage support components such as the controller hardware, power supplies, etc. Within the enclosure, storage media are stored up front, with control electronics, power supplies, and other equipment stored at rear. The storage media is separated from other non-drive storage support components by a central ventilating chamber. Two separate cooling paths are utilized. In one cooling path, intake air enters the storage media from the enclosure's front face, then passes into the central ventilating chamber before exhausting through the chamber's side wall. A separate cooling path serves the controller hardware, power supplies, and other non-storage equipment. In this path, intake air passes laterally through the control electronics. The two cooling paths are driven by multiple fans, which may be provided in a common container for ease of installation, repair, replacement, etc.

The foregoing features may be implemented in a number of different forms. For example, the invention may be implemented to provide an apparatus such as a disk drive storage enclosure with an isolated cooling path for the storage media. In another embodiment, the invention may be implemented to provide a method of cooling a disk drive storage enclosure using separate paths for storage drives and non-storage equipment.

The invention affords its users with a number of distinct advantages. For example, the independent, dual cooling paths keep the disk drive storage media cooler than previous arrangements. One reason for this is that the drives' abbreviated cooling path offers less resistance to intake air; after passing over the drives, air is quickly vented from the storage enclosure without having to pass through downstream control electronics. Another reason for the improved disk drive cooling is that the drives are physically separated from support electronics that can produce significant heat. Beneficially, running the drives at a cooler temperature helps increase the equipment's lifespan, known as "mean time before 'failure'" (MTBF). As another benefit, control electronics enjoy more efficient cooling because their intake air comes directly from outside, rather than air that has already been warmed by passing over storage media. The invention also provides a number of other advantages and benefits, which should be apparent from the following description of the invention.

DETAILED DESCRIPTION

The nature, objectives, and advantages of the invention will become more apparent to those skilled in the art after considering the following detailed description in connection with the accompanying drawings.

HARDWARE COMPONENTS & INTERCONNECTIONS

Introduction

One aspect of the invention concerns a disk drive storage enclosure, which may be embodied by various hardware components and interconnections. Broadly, the enclosure provides one cooling path for storage media and a separate cooling path for other non-drive storage support components such as controller hardware, power supplies, cooling fan electronics, etc. Within the enclosure, storage media are stored up front, with non-storage components stored at rear. A central ventilating chamber separates the storage media from the non-drive storage support components. In one cooling path, intake air enters the storage media from the enclosure's front face, then passes into the central ventilating chamber before exhausting through the chamber's side wall. A separate cooling path serves the non-drive storage support equipment. In this path, intake air passes laterally through the non-drive storage support equipment. The cooling paths are driven by multiple fans, which may be provided in a common container for ease of installation, repair, replacement, etc.

Housing

Figure 1:
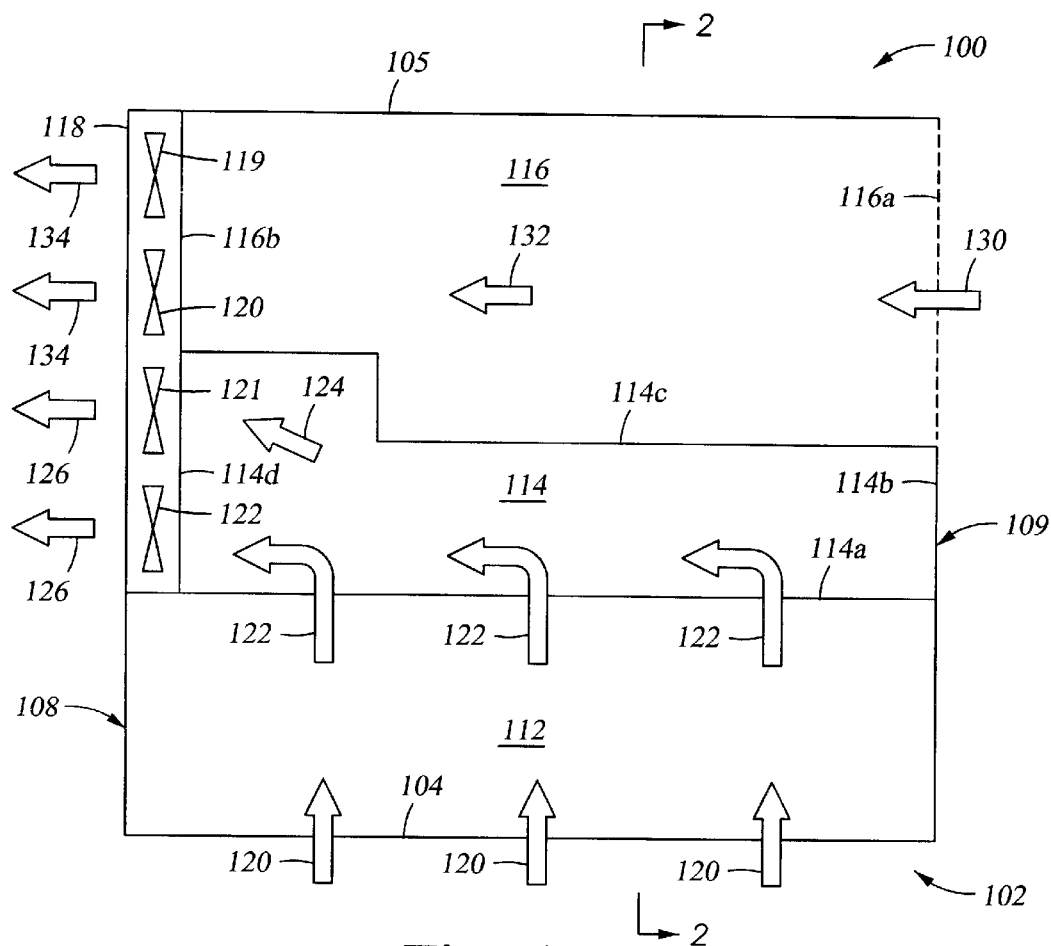
FIG. 1 is a cutaway top plan view of a disk drive storage enclosure according to the invention.
Figure 2:
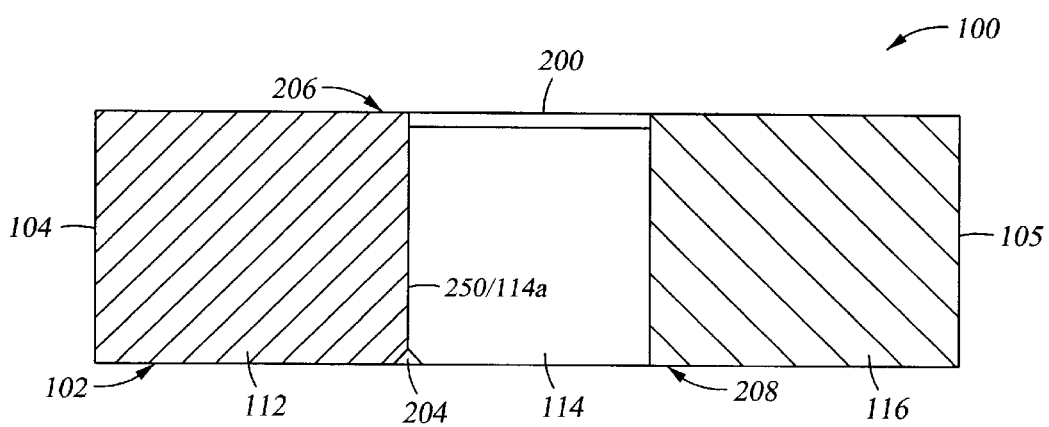
FIG. 2 is a cross-sectional side view of a disk drive storage enclosure according to the invention.

As more particularly shown in FIGS. 1–2, the enclosure 100 includes a box-shaped housing 102, including a front face 104, rear face 105, intake side 109 and exhaust side 108. Although a generally rectangular shape is shown, corners may be rounded, curved sides or faces employed, or other design changes made without departing from the scope of this invention. The enclosure 102 is made from one or more suitably sturdy substances such as steel alloys.

Disk Drive Storage Bay

A disk drive storage bay 112 occupies the front face 104. The disk drive storage bay 112 is defined by the front face 104, forward portion of the intake side 109, forward portion of the exhaust side 108, and a boundary 114a that is described below. The disk drive storage bay 112 includes rails, compartments, guides, channels, posts, and/or other features (not shown) to slidably receive modular magnetic disk drive storage drawers, such as SEAGATE Model ST136403FC units. Multiple of the drawers may be slidably inserted side-by-side and/or top-to-bottom until the bag 112 is filled. Each drawer has a front panel that is exposed at the front face 104, but the body of the drawer extends back inside the bay 112 toward the boundary 114a. The boundary 114a may comprise a perforated wall, series of posts, assembly of slats, or other air permeable structure to prevent drawers from sliding back into the ventilated air chamber 114, which is discussed below. One example is the wall 250 shown in FIG. 2. As an alternative, ridges, bumpers, raised stoppers, or other smaller features may be provided along the boundary 114a, offering even less resistance to air exchange between the bay 112 and the chamber 114, described below. One example is the bumper 204 shown in FIG. 2. As still another alternative, the boundary 114a may naturally arise from structure that prevents disk drives from sliding too far back, such as an oversized front panels on each disk drive that prevent the drive's face from sliding past the front face 104 of the housing. In this embodiment, there is no requirement for walls, slats, bumpers, stoppers, or any additional structure at the boundary 114a.

Non-Drive Storage Support Equipment Bay

In contrast with the disk drive storage bay 112, a non-drive storage support component bay ("non-drive bay") 116 occupies the rear face 105. The bay 116 is configured to house electronic and/or non-electronic components such as one or more disk drive controllers, power supply electronics, cooling fan electronics, and other non-disk-drive equipment that can be remotely located from the disk drives. The bay 116 has an air permeable wall 116a at the intake side 109, and another air permeable wall 116b (or no wall at all) where it meets fans (described below) at the exhaust side 108. The non-drive bay 116 may be advantageously configured to slidably receive modular electronics units, such as RAID controllers, cache with battery backup, power supplies, input/output ports, interface cards, and the like.

Ventilation Chamber

One novel feature of the present invention is the central ventilation chamber 114. The chamber 114 lies between the disk drive bay 112 and the non-drive bay 116. The chamber 114 is defined by the boundary 114a, an air impermeable wall 114b at the air intake side 109, and an air impermeable wall 114d at the exhaust side 108. The wall 114c is sufficiently solid to prevent air flow between the chamber 114 and the non-drive bay 116. In this respect, the wall 114c may comprise a layer of sheet metal, for instance. The ventilation chamber 114 is empty, to maximize airflow from the disk drive bay 112 through various fans, as shown in greater detail below.

Figure 5:
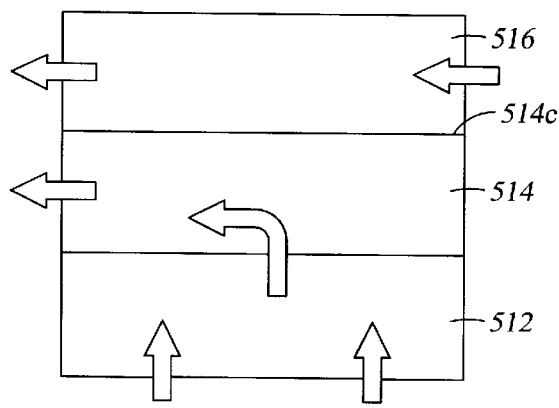
FIG. 5 is a schematic diagram showing air flow in an alternative embodiment of disk drive storage enclosure according to the invention.

In the illustrated embodiment, the chamber 114 includes a notched area 170. The area 170 permits the narrow chamber 114 to access a wider outlet area including two fans 121–122, even when the size of control electronics and power supply equipment in the bay 116 prevent the chamber 114 from occupying a two-fan depth from intake side 109 to exhaust side 108. Although the illustrated embodiment provides certain advantages, various different arrangements may be employed instead, as will be apparent to ordinarily skilled artisans (having the benefit of this disclosure). As one alternative, the non-drive storage support equipment may downsized, thereby yielding a smaller bay 116 to accommodate an un-notched, fully rectangular chamber 114 that is two-fans deep. As another alternative, smaller fans may be utilized to provide redundant fans to the chamber 114 without using the notch 170. FIG. 5 shows one example of a fully rectangular ventilation chamber 514 located between a disk drive storage bay 512 and a non-drive bay 516. The chamber 514 exhibits a substantially straight rear wall 514c.

Fans

The enclosure 100 includes multiple fans located along the exhaust side 108. The fans are positioned so that there is at least one fan between the non-drive bay 116 and the exhaust side 108, and at least one fan between the chamber 114 and the exhaust side 108. In the illustrated example, a single fan assembly 118 is shown. The fan assembly 118 includes four fans 119–122, where two fans 119–120 are located between the non-drive bay 116 and the exhaust side 108, and two fans 121–122 are located between the ventilation chamber 114 and the exhaust side 108. This arrangement provides some redundancy, since there are two fans for the bay 116 and two fans for the chamber 114 (which ventilates the bay 112).

If desired, the fan assembly 118 may comprise a unitary case that is removably attached to the enclosure 102, such as by sliding. This aids convenient diagnosis and replacement of fans 119–122 that malfunction. In this embodiment, the unitary case 118 includes a suitable electrical connector (not shown) to receive power for all the fans 119–122 from a complementary electrical connector (not shown) provided in the region of the enclosure 102 that receives the case 118. As an example, the fan assembly 118 may include a printed circuit card with card-edge fingers that plug into a corresponding receptacle electrically attached to a power supply in the bay 116, or vice versa.

Figure 3:
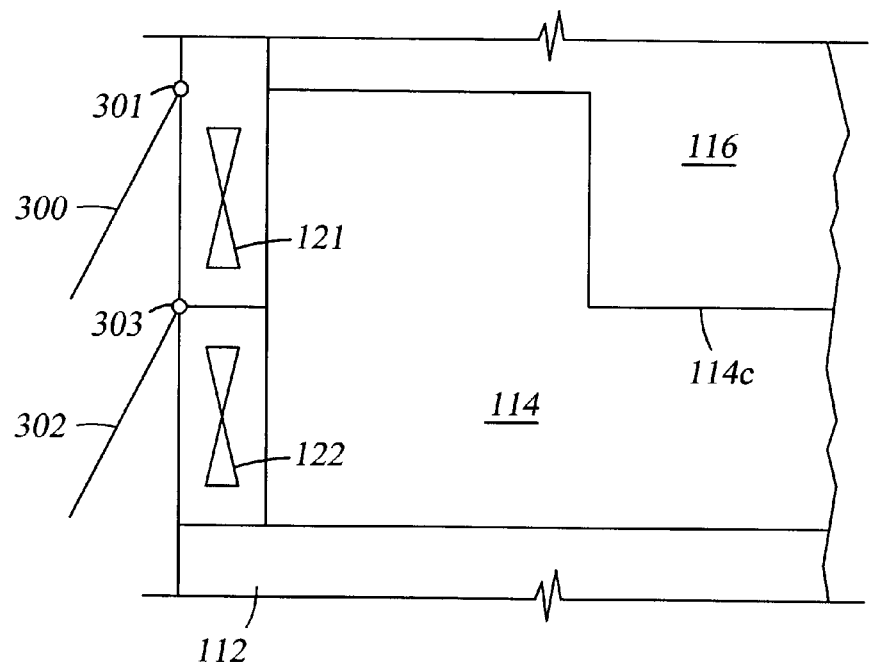
FIG. 3 is an enlarged, cutaway top view of a disk drive storage enclosure showing one illustrative type of fan gate according to the invention.
Figure 4:
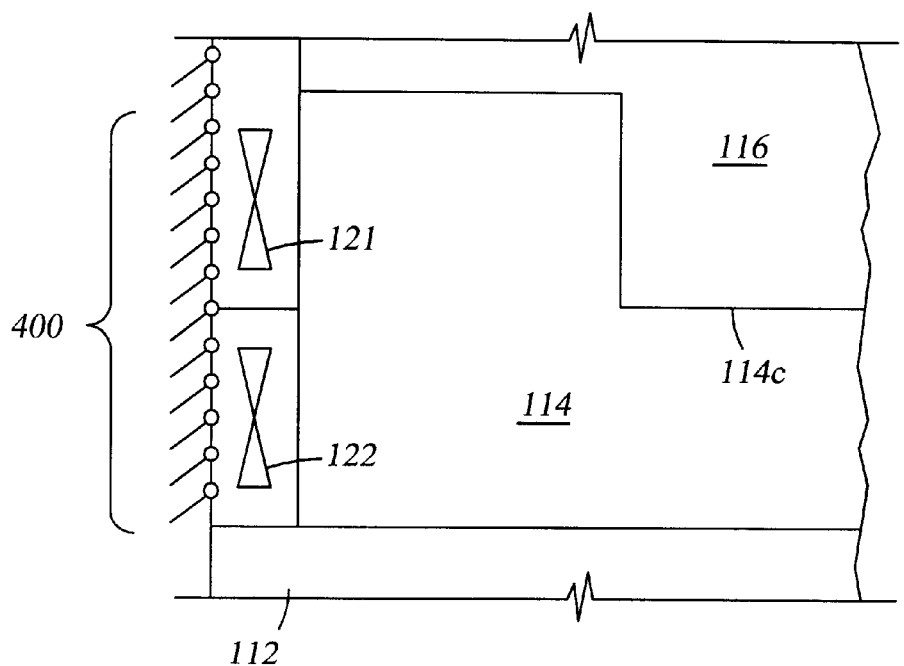
FIG. 4 is an enlarged, cutaway top view of a disk drive storage enclosure showing another illustrative type of fan gate according to the invention.

As an optional feature, the fan assembly 118 may incorporate one or more one-way flow gates. As explained below, the flow gates prevent a surviving fan from creating backflow in case its redundant partner fails. In the example of FIG. 3, the fans 121–122 include respective shutters 300, 302 serving as one-way flow gates. The shutters 300, 302 pivot on respective hinges 301, 303. If one of the fans 121–122 fails, the surviving fan may begin to draw air backwards through the failed fan ("backflow") instead of drawing air from the chamber 114. With the flow gates illustrated in FIG. 3, the backflow causes the corresponding shutter to close. This forces the operating fan to draw air from the chamber 114. FIG. 4 shows another arrangement, which uses many smaller, separately hinged mini-shutters 400 to the same effect.

Mezzanine Board

Another novel feature of the present invention is a mezzanine board 200, most clearly shown in FIG. 2. The board 200 comprises a printed circuit board that electrically connects the disk drives (in bay 112) to the non-drive storage support equipment (in bay 116) and may even serve as an electrical backplane or mother board. In addition to connecting components in the bays 112, 116, the board 200 may also include independent circuitry, such as processors, memory, discrete circuit elements, logic, etc. The board 200 is provided along a top 206 (as illustrated) or bottom 208 of the enclosure 102, and therefore serves to define an upper or lower surface of the ventilation chamber 114. Advantageously, this positioning does not impede free airflow through the chamber 114, since the mezzanine board 200 lies along the boundary of the ventilation chamber 114 rather than occupying any space internal to the chamber 114.

OPERATION

Figure 6:
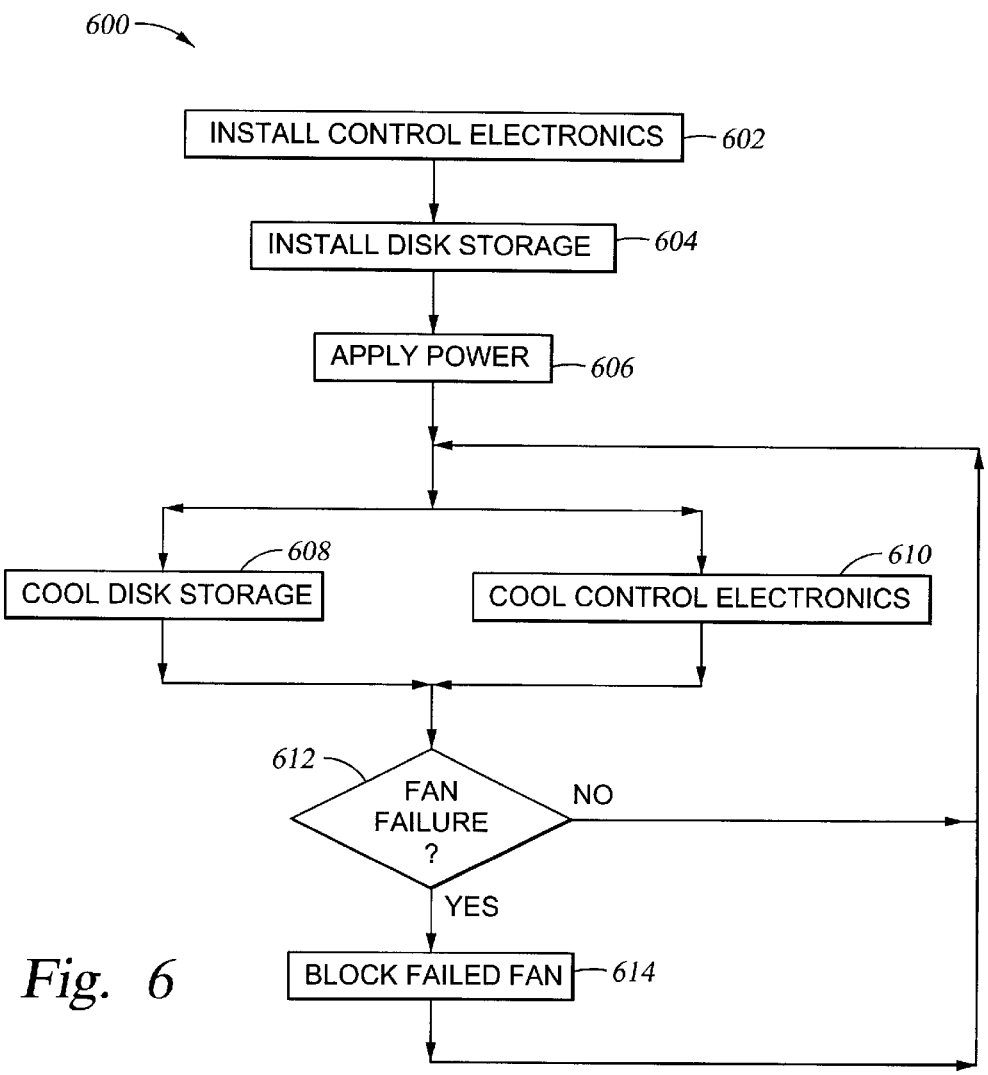
FIG. 6 is a flowchart of an operational sequence for cooling a disk drive storage enclosure according to the invention.

In addition to the various hardware embodiments described above, a different aspect of the invention concerns a method of cooling a disk drive storage enclosure using one separate path for disk drive storage and a separate path for other non-drive storage support equipment. FIG. 6 shows a sequence 600 to illustrate this cooling process. For ease of explanation, but without any intended limitation, the example of FIG. 6 is described in the context of the disk drive storage enclosure 100 described in FIGS. 1–2.

In step 602, technicians install control electronics, power supplies, and other non-drive storage support equipment into the bay 116. This step may be performed during initial manufacture of the housing 102, during subsequent repair, etc. In step 604, disk drive storage components are installed into the disk drive storage bay 112. This step may be performed by technicians, for example upon initial manufacture of the tray 102, or by a user after repair or replacement of one or more disk drives.

After step 606, external power is applied to the enclosure 102 (step 606). This may be performed, for example, by installing the enclosure 102 in a larger rack, connecting a power distribution cord to power supplies inside the bay 116, etc. Step 606 may involve other actions as well, such as activating an "ON" switch provided on the enclosure 102. Although the fans 119–122 may be activated automatically upon power-up, one or more separate control switches may be provided for activating the fans. Step 606 may be performed during manufacturing tests, demonstrations, boot-up at the customer's site, or any other occasion for utilizing the disk storage.

When the fans 119–122 are activated, by whatever means, cooling begins. In step 608, flowing air cools the disk drive storage bay 112 and its resident disk drives. More particularly, the fans 121–122 create air flow from the front face 104 over the disk drive equipment in the bay 112, as shown by flow path 120. This air then flows into and through the central ventilation chamber 114, as shown by flow paths 122, 124. The chamber 114 exhausts this air through the exhaust side 108, via the fans 121–122 as shown by flow paths 126. The wall 114c prevents the chamber's flow path 124 from impinging upon the non-drive bay 116. Thus, air warmed by the disk drive equipment in the bay 112 is exhausted straight away in a first cooling path, separate from the non-drive storage support equipment.

In step 610, the fans 119–120 create air flow in a second cooling path, separate from the disk drive bay 112. Namely, air flows from the intake side 109 (at the wall 116a) and over the equipment in the bay 116, as shown by flow paths 130, 132. This air exits the bay 116 through the fans 119–120 as shown by the flow paths 134. The wall 114c prevents any air exchange between the bay 116 and the central ventilation chamber 114. In other words, the wall 114c prevents the non-drive flow path 130, 132 from interfering with airflow in the disk drive storage bay 112. In contrast with prior arrangements, control electronics (and other equipment in the bay 116) receive outside air, rather than air that was previously warmed by upstream disk drive equipment.

If any of the fans 119–122 fail, the failure is recognized in step 612, which advances to step 614. In step 614, the implemented configuration of shutters (300–302 or 400) blocks the failed fan. After blocking the failed fan (step 614), normal cooling continues in steps 608, 610. Similarly, in the absence of fan failure, step 612 returns to steps 608, 610 for continued cooling.

OTHER EMBODIMENTS

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present invention contemplates various changes beyond such specific order.

What is claimed is:

1. A method for cooling disk drive storage equipment, comprising operations of:

providing an enclosure having front and rear faces connected by opposing intake and exhaust sides, disk drive storage occupying the front face and extending rearward to a prescribed depth, non-drive storage-support equipment coupled to the disk drive storage occupying the rear face and extending forward a prescribed amount, and a central ventilation chamber defined between the disk drive storage and the non-drive storage support components;

collecting air from the front face into the central ventilation chamber through the disk drive storage and exhausting said collected air out the exhaust side;

collecting air from the intake side into the non-drive storage support equipment and exhausting said collected air out the exhaust side; and preventing exchange of air between the central ventilation chamber and the non-drive storage support equipment.

2. The method of claim 1, where:

the collecting of air from the front face into the central ventilation chamber is performed by multiple fans;

the operations further comprise, in the event of failure of one of the fans, automatically blocking airflow through the failed fan.

3. A method of cooling a disk drive storage facility including a substantially rectangular housing including opposing front and rear faces attached by opposing intake and exhaust sides, the enclosure containing disk drive storage along the front face and non-drive storage support equipment along the rear face, the method comprising the operations of:

directing air through a first cooling path by withdrawing air through the front face into the disk drive storage and exhausting said air out the exhaust side, the first cooling path being independent of the non-drive storage support components; and directing air through a second cooling path by withdrawing air through the intake side into the non-drive storage support equipment and exhausting said air out the exhaust side, the second cooling path being independent of the disk drive storage.

4. A disk drive storage tray apparatus, comprising:

a substantially rectangular housing having front and rear faces connected by opposing intake and exhaust sides;

a disk drive storage bay occupying the front face;

a non-drive storage support equipment bay occupying the rear face and having air permeable walls along the intake and exhaust sides;

a central ventilation chamber defined between the disk drive storage bay and the non-drive storage-support component bay, the chamber including a wall to prevent air flow between the chamber and the non-drive storage-support component bay, the chamber permitting air entry from the disk drive storage bay and including an air permeable wall along the exhaust side; and multiple fans, including at least one fan between the non-drive storage-support component bay and the exhaust side, and at least one fan between the disk drive storage bay and the exhaust side.

5. The apparatus of claim 4, there being multiple fans between the non-drive storage support equipment bay and the exhaust side, and multiple fans between the disk drive storage bay and the exhaust side.

6. The apparatus of claim 4, further comprising a fan case removably attached to the housing and containing the multiple fans.

7. The apparatus of claim 4, where:

the housing further including opposing upper and lower surfaces interconnecting the faces and the sides;

the storage tray further includes a mezzanine circuit board bridging between the disk drive storage bay and the non-drive storage support equipment bay along one of the following surfaces: the upper surface, the lower surface.

8. The apparatus of claim 4, further comprising:

disk drive storage located in the disk drive storage bay; and non-drive storage support equipment located in the non-drive storage support equipment bay.

9. The apparatus of claim 5, one or more of the fans including a one-way flow gate.

10. The apparatus of claim 5, the fans being provided by:

a fan case including at least one fan aligned with the non-drive storage support equipment bay and at least one fan aligned with the central ventilation chamber.

11. A storage tray, comprising:

a substantially rectangular housing having front and rear faces connected by opposing first and second sides, the front face being air permeable;

disk drive storage occupying the front face;

non-drive storage support equipment occupying the rear face, the housing providing air permeable walls along the first and second sides abeam the non-drive storage support equipment;

an unoccupied central ventilation chamber defined between the disk drive storage and the non-drive storage support equipment, the chamber including one or more walls preventing air flow between the chamber and the non-drive storage support equipment, the chamber permitting air entry from the disk drive storage in the chamber, the housing providing an air permeable wall along one of the sides abeam the chamber;

multiple fans, including at least one fan between the non-drive storage support equipment and one of the air permeable walls along the first and second sides abeam the non-drive storage support equipment, and at least one fan between the disk drive storage and the air permeable wall abeam the chamber.

12. A storage tray, comprising:

a substantially rectangular enclosure including opposing front and rear faces attached by opposing intake and exhaust sides, the intake and exhaust sides having air permeable regions;

a disk drive storage bay within the enclosure;

a non-drive storage support equipment bay within the enclosure;

a first cooling path withdrawing air through the front face into the disk drive storage bay and exhausting said air out the exhaust side, the first cooling path being independent of the non-drive storage support equipment bay; and a second cooling path withdrawing air through the intake side into the non-drive storage support equipment bay and exhausting said air out the exhaust side, the second cooling path being independent of the disk drive storage bay.

13. A disk drive storage tray, comprising:

substantially rectangular enclosure having front and rear faces connected by opposing intake and exhaust sides;

first means for housing disk drive storage units, said first means occupying the front face;

second means for housing non-drive storage-support components, said second means occupying the rear face and having air permeable walls at the intake and exhaust sides;

third means between the first and second means for routing air from the first means and exhausting said collected air out the exhaust side while preventing interchange of air with the second means; and fan means for collecting air from the second means independent of the first means and exhausting air collected from the second means out the exhaust side.

14. A method for cooling electronic equipment, comprising operations of:

providing an enclosure having front and rear faces connected by opposing intake and exhaust sides, a first body of electronic equipment occupying the front face and extending rearward to a prescribed depth, a second body of electronic equipment coupled to the first body occupying the rear face and extending forward a prescribed amount, and a central ventilation chamber defined between the first and second bodies;

collecting air from the front face into the central ventilation chamber through the first body and exhausting said collected air out the exhaust side;

collecting air from the intake side into the second body and exhausting said collected air out the exhaust side; and preventing exchange of air between the central ventilation chamber and the second body.

15. A method of cooling an electronics facility including a substantially rectangular housing including opposing front and rear faces attached by opposing intake and exhaust sides, the enclosure containing front electronics along the front face and rear electronics along the rear face, the method comprising the operations of:

directing air through a first cooling path by withdrawing air through the front face into the front electronics and exhausting said air out the exhaust side, the first cooling path being independent of the rear electronics; and; and directing air through a second cooling path by withdrawing air through the intake side into the rear electronics support equipment and exhausting said air out the exhaust side, the second cooling path being independent of the front electronics.

16. A disk drive storage tray, comprising:

a substantially rectangular housing having front and rear faces connected by opposing intake and exhaust sides;

a front bay occupying the front face;

a rear bay occupying the rear face and having air permeable walls along the intake and exhaust sides;

a central ventilation chamber defined between the front bay and the rear bay, the chamber including a substantially solid wall to prevent air flow between the chamber and the rear bay, the chamber permitting air entry from the front bay and including an air permeable wall along the exhaust side; and multiple fans, including at least one fan between the rear bay and the exhaust side, and at least one fan between the front bay and the exhaust side.

17. A storage tray, comprising:

a substantially rectangular housing having front and rear faces connected by opposing first and second sides, the front face being air permeable;

a first electronics occupying the front, face;

a second electronics occupying the rear face, the housing providing air permeable walls along the first and second sides abeam the first electronics;

an unoccupied central ventilation chamber defined between the first and second electronics, the chamber including one or more walls preventing air flow between the chamber and the second electronics, the chamber permitting air entry from the first electronics into the chamber, the housing providing an air permeable wall along one of the sides abeam the chamber;

multiple fans, including at least one fan between the second electronics and one of the air permeable walls along the first and second sides abeam the second electronics, and at least one fan between the first electronics and the air permeable wall abeam the chamber.

18. A storage tray, comprising:

a substantially rectangular enclosure including opposing front and rear faces attached by opposing intake and exhaust sides, the intake and exhaust sides having air permeable regions;

separate first and second bays within the enclosure;

a first cooling path withdrawing air through the front face into the first bay and exhausting said air out the exhaust side, the first cooling path being independent of the second bay; and a second cooling path withdrawing air through the intake side into the second bay and exhausting said air out the exhaust side, the second cooling path being independent of the first bay.

19. A disk drive storage tray, comprising:

a substantially rectangular enclosure having front and rear faces connected by opposing intake and exhaust sides;

first means for housing electronic equipment, said first means occupying the front face;

second means for housing electronic equipment, said second means occupying the rear face and having air permeable walls at the intake and exhaust sides;

third means between the first and second means for routing air from the first means and exhausting said collected air out the exhaust side while preventing interchange of air with the second means; and fan means for collecting air from the second means independent of the first means and exhausting air collected from the second means out the exhaust side.

* * * * *

UNITED STATES PATENT AND TRADEMARK OFFICE
CERTIFICATE OF CORRECTION

PATENT NO.   : 6,445,581 B1
DATED        : September 3, 2002
INVENTOR(S)  : Guy A. Carbonneau et al.

It is certified that error appears in the above-identified patent and that said Letters Patent is hereby corrected as shown below:

<u>Column 7,</u>
Line 55, insert the word -- apparatus -- between "tray" and "further".

<u>Column 8,</u>
Line 48, insert the word -- a -- before "substantially".

Signed and Sealed this

Eleventh Day of March, 2003

JAMES E. ROGAN
*Director of the United States Patent and Trademark Office*